Figure 1:
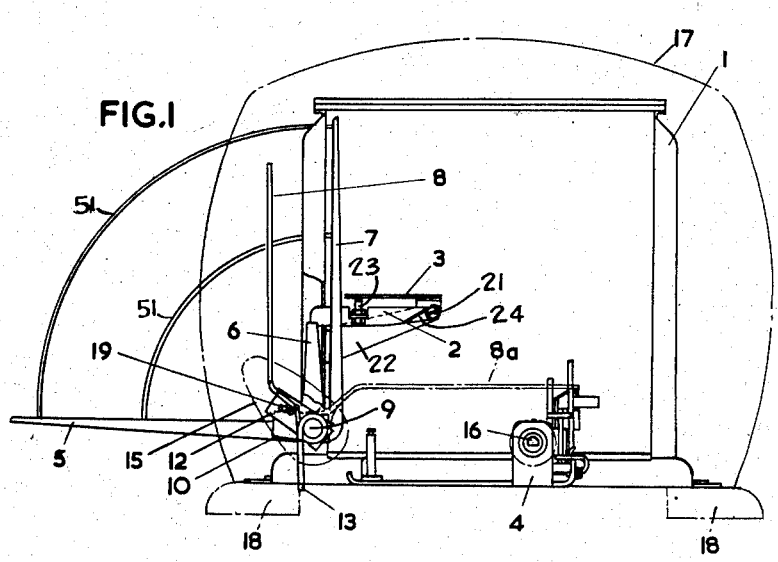

May 19, 1959

J. L. BACON 2,887,039

TOASTERS

Filed Jan. 19, 1956

2 Sheets-Sheet 1

INVENTOR
JAMES LAURENCE BACON

By Kane and Nydick
ATTORNEYS

May 19, 1959   J. L. BACON   2,887,039
TOASTERS

Filed Jan. 19, 1956   2 Sheets-Sheet 2

INVENTOR
JAMES LAURENCE BACON

By Hane and Nydick
ATTORNEYS

United States Patent Office
2,887,039
Patented May 19, 1959

2,887,039

TOASTERS

James Laurence Bacon, Bexleyheath, England, assignor to Morphy-Richards Limited, Kent, England, a British company Application January 19, 1956, Serial No. 560,265

5 Claims. (Cl. 99—328)

This matter relates to electric toasters and particularly to automatic toasters of the kind in which the bread is placed in a carriage and moved manually or automatically to a position between heating elements, a timer being arranged to terminate the toasting automatically when the bread has reached a desired colour. It is well known in the art that the problem of providing a satisfactory timer centres on the fact that, owing to the thermal mass of the heating elements and associated parts, the periods of energization necessary to produce bread of uniform colour decrease as the toaster warms up. Accordingly a timer which merely terminated the toasting after a given time interval from the beginning of each operation of the toaster would not be satisfactory.

In the latest known toasters the toasting period is, in one way or another, varied in accordance with the state of the toaster to give bread of uniform colour. Such arrangements, however, are open to the objection that only in one particular state of the toaster will the toasting rate be that which gives toast of ideal quality. Excessively slow toasting tends to produce toast which is dried right through, while excessively rapid toasting tends to give toast which is charred at the surface while still very moist at the centre. The present invention provides an arrangement whereby all slices are toasted at substantially the same rate, so that the toast will be not only of uniform colour but also of uniform quality.

In accordance with the invention this result is obtained by arranging that in the loading (or delivery) position of the carriage the bread is not exposed to the action of the heating elements and by moving the bread into the toasting chamber only when that chamber has reached a given state, namely that which will produce toast of the desired colour in the optimum time. The toasting periods required are, therefore, of constant length although the overall length of each toasting operation will vary in accordance with the state of the toaster at the commencement of the operation, a delay being introduced where necessary between the energization of the heater elements to begin the operation and the movement of the bread into the chamber to begin the toasting period.

In most, if not all automatic electric toasters of the kind referred to which are now in use, the arrangement is such that in the delivery position of the carriage the bread is located in a position more or less directly above an open topped toasting chamber where it is exposed to hot air rising from the heating elements. If the bread were held in such a position for any length of time after the heating elements had been switched on, a considerable amount of pre-drying would occur. Such pre-drying not only affects the quality of the toast but also tends to warp the bread and thereby interfere with its movement into the toasting chamber. Such arrangements are accordingly unsuitable for the purposes of the present invention but pre-drying of the bread can be prevented by suitably protecting bread in the delivery position from the action of the heating elements, as by arranging the delivery position to one side of the toasting chamber and/or providing screening means between the toasting chamber and bread in the delivery position.

The invention thus includes an electric toaster comprising heating elements, a holder for supporting bread to be toasted which is movable between a toasting position and a delivery position, in which latter position the bread is not exposed to the action of the heating elements, and means for preventing the holder from moving from the delivery position to the toasting position until the heating elements and their associated parts have reached a predetermined temperature.

The invenion also includes a toaster comprising heating elements for bread toasting, a timer for determining substantially constant toasting periods, a holder for supporting the bread in a delivery position in which the bread is not exposed to the action of the heating elements and in a toasting position, and means including a thermally responsive member sensitive to toast chamber temperature for effecting movement of the holder from the delivery to the toasting position but arranged to delay such movement until the elements and their associated parts have reached a predetermined temperature, the said temperature being that which results in the successive toasting periods required to produce toast of a given colour being substantially uniform.

A toaster in accordance with the invention may include a spring mounted, manually operated loading arm, which normally holds the bread carriage in its delivery position. When bread is placed on the bread carriage and the loading arm is moved against the action of its spring, the main switch is closed to energise the elements but (assuming that the toasting chamber is not already in the required state) the bread carriage although biased into the toasting position is retained by suitable means in the delivery position. A thermally responsive member is arranged to provide a force or a movement or both which varies with the state of the elements and upon this member reaching a critical temperature it allows the bread carriage to enter the toasting chamber, the interval before toasting actually begins thus varying in dependence upon the initial state of the toaster. The thermally responsive member may be disposed in or near the toasting chamber and be heated by the main elements, or it may be separately heated, the thermal mass of its heater being related to that of the main elements. When the carriage moves to the toasting position, a preset fixed toasting period is initiated and at the end of this period the loading arm is released to return the carriage to the delivery position and open the main switch. The toasting period may be timed by any suitable means, including clockwork, a synchronous motor, a bimetal timer, a leaking bellows and a dashpot. It is also possible to omit the timing means altogether, the toasting period being terminated manually when desired.

Figure 2:
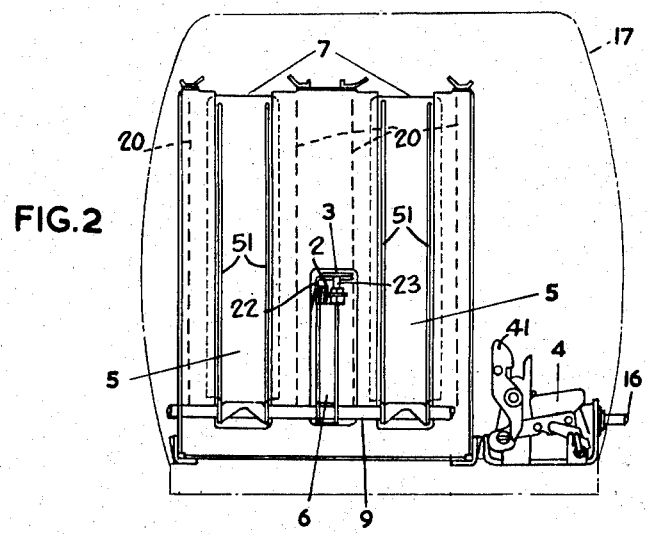
Figure 3:
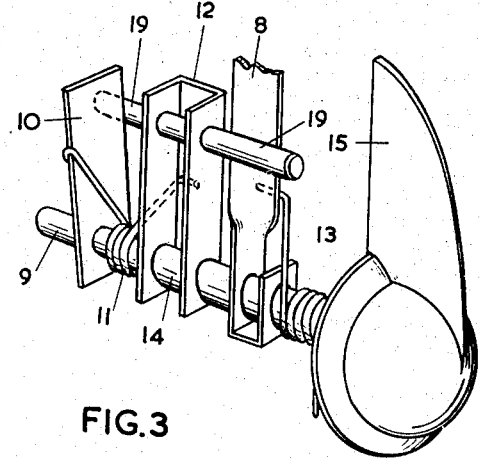
Figure 4:
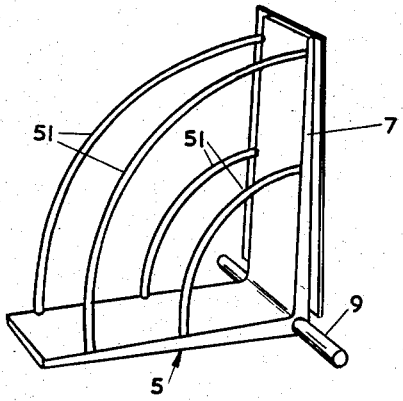

A particular form of toaster in accordance with the invention is shown by way of example in the accompanying diagrammatic drawing in which Figure 1 is a side view and Figure 2 an end view, while Figures 3 and 4 show details.

The toaster illustrated comprises a fixed framework 1, which provides two parallel, vertically disposed toasting chambers, each containing two spaced vertically disposed heating elements (whose positions are indicated at 20). The framework is supported on feet (indicated at 18) and enclosed in an outer casing (indicated at 17) which is apertured at one end to permit movement to and from the toasting position of the bread carriage 5. The bread carriage comprises two L-shaped members (one for each toasting chamber) which are fast on a shaft 9, rotatably supported in framework 1, one of these members being shown in Figure 4. When the carriage is in the delivery position illustrated, one arm of each member projects horizontally from the casing 17 and provides a support for a slice of bread, the slice being held upright by wires 51 extending between the arms of the L-shaped member, while the other arm 7 of the member is vertically disposed and forms a shield or screen closing the end of the corresponding toasting chamber and protecting the bread from the action of the heating elements. On rotating the shaft 9 (clockwise in Figure 1) through a right angle the bread slices are introduced into the toasting chambers between the pairs of heating elements and are then supported on the arms 7, the originally horizontal arms substantially closing the ends of the toasting chambers.

One end of shaft 9 is rotatably engaged in sleeve 14 (see Figure 3) which projects outside casing 17 and carries a hand operating knob 15. An actuating arm 12, fast to sleeve 14, carries a cross pin 19 whose two ends are adapted to engage respectively a carriage lever 10, fast to shaft 9, and a loading arm 8 rotatably supported on sleeve 14. A helical wire spring 11 is engaged between parts 12 and 10 and a second spring 13 is engaged between loading arm 8 and the fixed frame 1. The free end of the loading arm 8, when rotated inwardly to a toasting position, is retained by a pivotal latch 41 forming part of a timing mechanism (indicated generally at 4) which can be adjusted from outside casing 17 by means of spindle 16. This timing mechanism is fully shown and described in U.S. Patent No. 2,641,993. Fast on the carriage shaft 9 is a lever 6, whose upper end is adapted to engage a shoulder on a delay arm 2, pivotally supported on the fixed frame 1 in the space between the two toasting chambers. Delay arm 2 is pivotally supported at 21 upon a bracket 22 and is spring biased upwardly (clear of the path of lever 6) by a torsion spring 24. A screw 23, adjustably secured in a lug struck from arm 2 engages against one end of a bimetallic strip 3 anchored at its other end to the bracket 22.

To initiate a toasting operation, knob 15 is turned (clockwise in Figure 1) through a right angle, thus rotating sleeve 14 and actuating arm 12. Loading arm 8 is thus swung down, stressing spring 13, into the position 8a where it is retained by the latch of the timer 4. This movement of lever 8 operates a switch to energize the heating elements. Movement of arm 12 also loads spring 11, but (assuming the toaster to have been initially at a low temperature) movement of the bread carriage is prevented by the engagement of arm 2 with lever 6. As the toaster warms up, bimetal 3 flexes upwardly, allowing arm 2 to rise, and when the toast chambers have reached the correct temperature lever 6 is released and the carriage is rotated by spring 11, which has been initially tensioned by the manual rotation of the knob 15, into toasting position. This movement of the carriage (or the movement of arm 2 or bimetal 3 which permits the carriage to move) serves to start the operation of the timing mechanism. On the expiry of a predetermined time (set by spindle 16) the timer releases loading arm 8 and spring 13 then returns the loading arm and the bread carriage to their starting positions, this movement (or the movement of the timer which permits it to take place) serving to open the heating circuit. Should it be desired to examine or extract the toast before the end of the timed cycle, knob 15 can be turned (counter clockwise in Figure 1) to rotate sleeve 14, arm 12, lever 10 and the bread carriage to starting position. Clockwise movement of knob 15 will then return the parts to toasting position. When the toaster is already warm at the time a toasting operation is initiated, the delay which occurs before movement of the carriage to toasting position will be reduced. When a toasting operation is initiated immediately after the completion of a previous operation, no delay will ordinarily be necessary and the delay mechanism will be so adjusted that arm 2 is then clear of lever 6, so that the bread carriage will move to toasting position upon clockwise rotation of knob 15.

I claim:

1. An electric toaster comprising heating elements, a holder for supporting bread to be toasted, said holder being movable between a toasting position in which position the bread is exposed to the heating elements and a delivery position in which latter position the bread is not exposed to the action of the heating elements, and temperature responsive means communicating with said heating elements preventing the holder from being moved from the delivery position to the toasting position until the heating elements and their associated parts have reached a predetermined temperature.

2. A toaster comprising heating elements for bread toasting, a timer for determining substantially constant toasting periods, a holder for supporting the bread in a delivery position in which the bread is not exposed to the action of the heating elements and in a toasting position relative to the heating elements, and control means including a thermally responsive member sensitive to toast chamber temperature for permitting movement of the holder from the delivery to the toasting position in response to said heating elements attaining a predetermined temperature.

3. A toaster in accordance with claim 2 further comprising a manually operable loading arm movable between a first position in which it holds the bread carriage in its delivery position and a second position in which it leaves the bread carriage free to move to toasting position, the bread carriage being then biased into toasting position, a spring urging the loading arm into its first position, a latch for retaining the loading arm in its second position, means operating in response to movement of the loading arm from its first to its second position to close the energizing circuit of the heating elements, said control means including a thermally responsive member whose state varies with that of the elements, means operating while the thermally responsive member is below a predetermined temperature to prevent the bread carriage from moving to toasting position and to permit it to do so when that temperature is attained, a timer for measuring constant periods of time, means responsive to movement of the bread carriage to toasting position to energize the timer, and means actuated by the timer a predetermined period after its energization for releasing the latch and permitting the loading arm to return to its first position.

4. A toaster in accordance with claim 3 in which heating elements are disposed in two spaced parallel vertical planes and the bread carriage is adapted to support a slice of bread in a vertical plane and to move it in that plane between a toasting position lying between the elements and a delivery position lying horizontally to one side of the toasting position and clear of the elements.

5. A toaster in accordance with claim 4 in which the bread carriage is pivotally supported on a horizontal axis and includes two mutually perpendicular portions radiating from the axis, and so arranged that when the carriage is in delivery position one portion extends horizontally away from the elements and provides a support for a slice of bread and the other portion is vertically disposed and forms a shield projecting the bread from the action of the elements, while in the toasting position of the carriage its second mentioned portion extends horizontally and provides a support for a slice of bread disposed between the elements.

References Cited in the file of this patent

UNITED STATES PATENTS

| 1,939,247 | Avery et al. | Dec. 12, 1933 |
| 2,195,638 | Anderson | Apr. 2, 1940 |
| 2,215,929 | Husk | Sept. 24, 1940 |
| 2,224,483 | Merrill | Dec. 10, 1940 |
| 2,641,993 | Morphy | June 16, 1953 |
| 2,667,828 | Koci | Feb. 2, 1954 |